No. 857,892. PATENTED JUNE 25, 1907.
J. J. NANCE.
ANIMAL TRAP.
APPLICATION FILED MAR. 11, 1907.

2 SHEETS—SHEET 1.

WITNESSES:
E. F. Stewart
F. T. Chapman

Joseph J. Nance, INVENTOR
By C. A. Snow & Co.
ATTORNEYS

No. 857,892. PATENTED JUNE 25, 1907.
J. J. NANCE.
ANIMAL TRAP.
APPLICATION FILED MAR. 11, 1907.

2 SHEETS—SHEET 2.

WITNESSES:

Joseph J. Nance, INVENTOR

By

ATTORNEYS

UNITED STATES PATENT OFFICE.

JOSEPH J. NANCE, OF OZONA, TEXAS, ASSIGNOR OF ONE-HALF TO JEFFERSON B. MOORE, OF OZONA, TEXAS.

ANIMAL-TRAP.

No. 857,892.　　　　Specification of Letters Patent.　　　Patented June 25, 1907.

Application filed March 11 1907. Serial No. 361,746.

*To all whom it may concern:*

Be it known that I, JOSEPH J. NANCE, a citizen of the United States, residing at Ozona, in the county of Crockett and State of Texas, have invented a new and useful Animal-Trap, of which the following is a specification.

This invention has reference to improvements in animal traps of that class in which an animal attempting to make away with a bait will cause the discharge of a gun in line with the bait in such manner as to cause the death of the animal.

The present invention has for its object to provide a gun to the trigger of which the bait is attached, and the gun is so mounted that the animal in attempting to carry off the bait will aim the gun at itself and, operating the trigger, will cause the discharge of the gun and the firing of one or more bullets or shot into itself in a manner most liable to kill or fatally wound the animal.

To this end the invention consists of a gun-barrel mounted for universal movement upon a post or stand, with the barrel separable for the insertion of a cartridge and provided with a spring-actuated firing pin controlled by a trigger, the operating mechanism for which latter is so located that the animal in attempting to carry off the bait fast to said trigger-operating mechanism will aim the gun toward a vital part of the animal and then cause the firing of the cartridge so that the animal receives the charge of the gun in a vital spot.

The invention will be fully understood from the following detailed description taken in connection with the accompanying drawings forming part of this specification, in which,—

Figure 1:
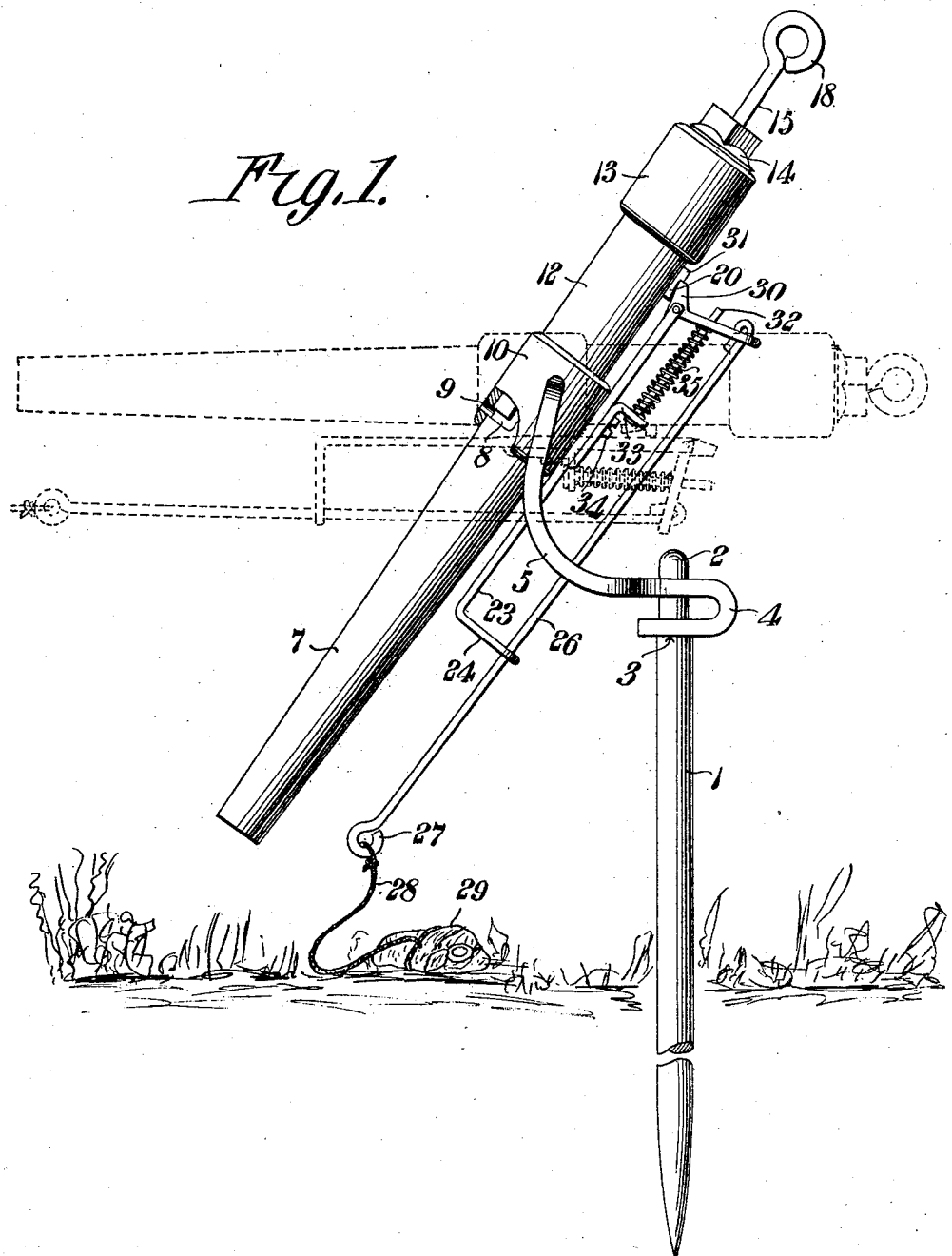
Figure 2:
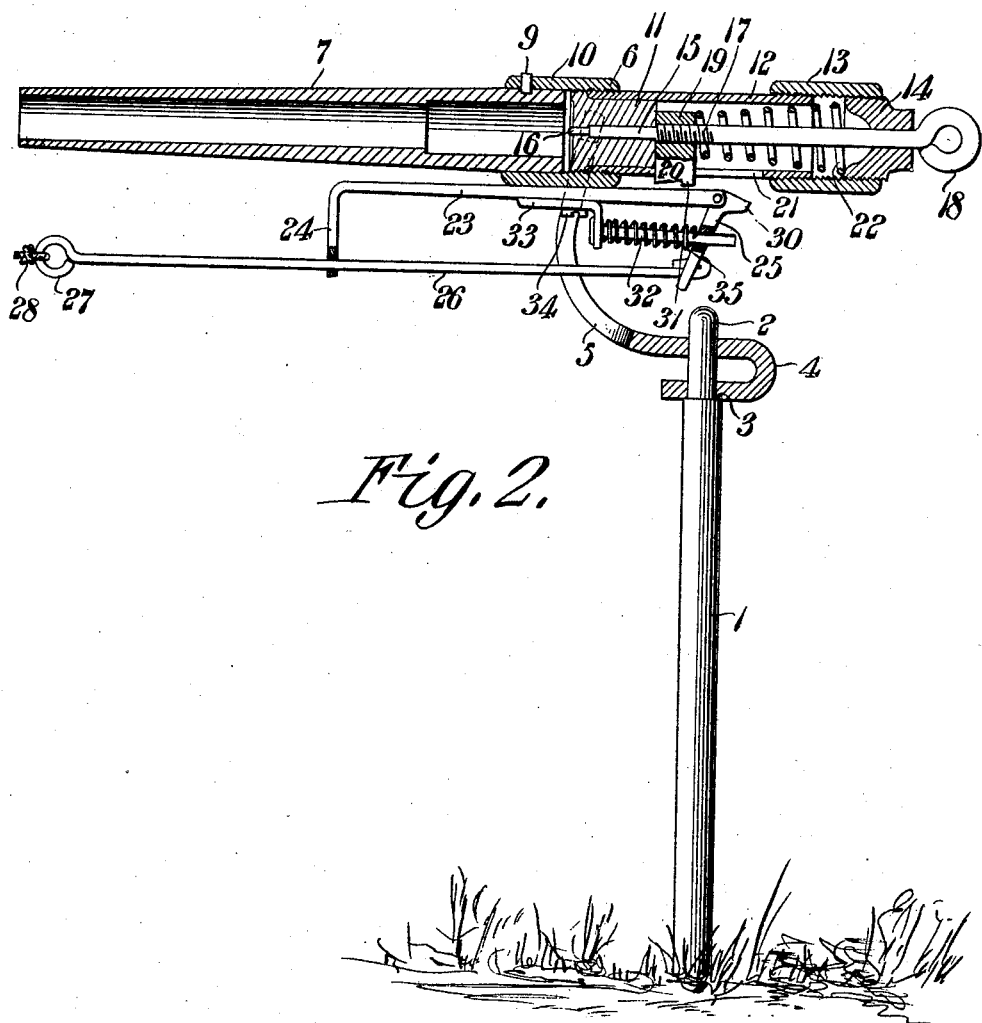

Figure 1 is a side elevation of the improved animal trap gun showing the same in normal position in full lines, and, in dotted lines, the position it may assume when the bait has been seized by an animal; and Fig. 2 is a longitudinal section, with parts in elevation, of the gun in the firing position and after the trigger has been pulled.

Referring to the drawings, there is shown a pointed peg or rod 1 having its upper end 2 of reduced diameter to form a shoulder 3. Upon the reduced end 2 the rod receives the two legs of the U-shaped end 4 of a frame, the other end of which is formed into two arms 5 appropriately bent and at their outer or free ends formed with inwardly projecting lugs 6 forming the trunnions of a gun which I will now describe. This gun consists of a barrel portion 7 near the breech of which is formed an angular groove 8 engaged by a pin 9 fast in one end of a collar 10 and projecting inwardly to engage in the groove 8. The other end of this collar 10 is formed with an internal screw-thread and there receives a breech-block 11, to the exterior of which is fitted the front end of a sleeve 12, which latter together with that portion of the breech-block extending beyond the sleeve 12 is threaded to enter the nut formed on the interior of the collar 10. The rear end of this sleeve 12 is threaded to receive an internally-threaded collar 13 into the end of which is inserted a threaded plug-block 14.

Extending centrally through the breech-block 11 is a firing pin 15 having its firing end 16 reduced and in the normal position projecting beyond the front of the breech-block. The hole through the breech-block for the firing pin is shouldered to form an abutment for the shoulder formed on the firing pin at the junction of the reduced end with the larger portion thereof. To the rear of the breech-block the firing pin is made of larger diameter and is threaded for a distance, as shown at 17. The firing pin is extended rearwardly through the plug 14 and exterior thereto is formed into an eye 18 by means of which the firing pin may be manipulated. The threaded portion of the firing pin carries a block 19 having at one side a wing 20 projecting laterally through a longitudinal slot 21 formed in the sleeve 12 back of the breech-block 11 and extending nearly or quite to the front end of the collar 13. Surrounding the firing pin between the block 19 and the plug 14 there is a spring 22, the normal tendency of which is to maintain the block 19 against the rear of the breech-block, in which position the end 16 of the firing pin projects through the front of the breech-block. It will be observed that the plug-block 14 is adjustable lengthwise in the collar 13, and, therefore, serves as a means for adjusting the tension of the spring 22. On the bottom of the collar 10 there is a longitudinal arm 23 having its front end down-turned, as shown at 24, and at its rear end carrying an angle lever 25 constituting the trigger. The long arm of this lever is pivotally connected to a rod 26 passing through a perforation in the lower end of the downturned portion of the bar 23, and this rod has it its front end an eye 27 to which is secured a rope or cord 28 carrying a bait 29 at the other end. The end of the lever 25 remote from that connected to the rod 26 constitutes the trigger pawl 30 arranged to engage behind a lug 31 formed on the under side of the extension 20 of the block 19.

Between the pivotal point of the lever 25 and its connection with the rod 26 it is suitably perforated for the passage of a fixed guide pin 32 secured at one end to a bracket 33 fast on the bar 23 adjacent to its point of connection with the collar 10; in fact, the screw 34 may serve to secure both the bracket 33 and the bar 23 to the collar 10. The trigger pawl 30 is normally in the path of the lug 31, being held for this purpose yieldingly by a spring 35 surrounding the guide pin 32.

Now, when the eye 18 of the firing pin is grasped and the firing pin is drawn backward against the action of the spring 22, the block 20 moves with it until the lug 31 has passed behind the pawl end 30 of the lever 25 and the spring 35 has caused the pawl end 30 to move upward and engage in front of this lug 31. The barrel 7 is turned to permit it to be withdrawn from the collar 10 and a cartridge of suitable type is inserted in the breech end of the barrel and the latter is then replaced in the collar 10 and turned to be locked in place by means of the pin 9 and bayonet groove 8. The normal tendency of the gun is to assume the position shown in Fig. 1, since the weights are so distributed that the front end of the gun overbalances the rear end, and the muzzle will therefore turn downward toward the ground. The bait 29, which may be meat or any other material attractive to animals which it is desired to destroy, is attached to the cord or string 28 either by means of a suitable hook or by being simply tied thereto, and this bait is laid on the ground at any convenient point close to the gun. When an animal seizes the bait and starts off with the same the gun is moved about its trunnions to approximately a horizontal position, being pulled to this position by the cord 28 and rod 26. As soon as the pull on the rod 26 is sufficient the trigger pawl 30 is pulled from behind the lug 31 and the firing pin is impelled forward by the expansion of the spring 22. The end 16 of the firing pin striking the cap in the center of the cartridge will cause the latter to be fired and the ball or shot in the cartridge will be driven into the animal's head or forequarters in a direction most liable to hit a vital spot and so kill the animal at once. Since the gun is universally mounted, the muzzle will point at the animal no matter in what direction it may carry the bait.

It will be understood, of course, that when it is desired to mount the gun the peg or rod 1 is driven into the ground until it is firmly seated therein, and the gun is mounted by slipping the two legs of the bracket 4 over the reduced end 2 of this rod until they engage with the shoulder 3. The rod is of such length that it will project from the ground a distance commensurate with the height of the animal to be killed, so that the muzzle of the gun when the latter is brought to an approximately horizontal position will be about on a level with the animal's head.

I claim:—

1. An animal trap comprising a gun having a separable barrel section, a breech-block to the rear thereof, a spring chamber back of the breech-block, a spring in the chamber a firing pin passing through the breech-block and surrounded by the spring, a trigger block fast on the firing pin, and a trigger in the path of the trigger block and arranged to be connected to the bait of the trap.

2. An animal trap comprising a gun composed of a separable barrel section, a breech-block to which the barrel section is removably attached, a slotted casing fast on the breech-block, a closure for the rear end of the casing, a firing pin extending through the breech-block and to and through the closure at the end of the casing, another block fast on the firing pin and provided with a guiding extension passing through a slot in the casing, a spring confined between the last-named block and the closure for the end of the casing, and a trigger in the path of the extension of the block carried by the firing pin.

3. In an animal trap, a gun comprising a removable barrel section, a breech-block, a casing carrying the same and extending to the rear thereof, a longitudinally adjustable closure for the rear end of the casing, a firing pin extending through the breech-block and the casing and through and exterior to the closure and there provided with a manipulating handle, a block carried by the firing pin, a trigger mechanism coacting therewith, and a spring within the casing between the block on the firing pin and the closure at the end of the casing and adjustable as to tension by the adjustment of the closure at the end of the casing.

4. An animal trap gun comprising a barrel section arranged to receive a cartridge, a breech-block, a connection between the breech-block and the barrel section to which the latter is removably connected, a chamber to the rear of the breech-block having its rear end provided with an adjustable closure, a firing pin extending through the breech-block, the chamber and the adjustable closure therefor, a spring acting on the firing pin and confined in the chamber to the rear of the breech-block, and a trigger mechanism for holding the firing pin against the action of the spring and for releasing it to the action of the spring.

5. An animal trap gun comprising a barrel section, a breech-block, a connection fast on the breech-block and to which the barrel section is removably secured, a slotted chamber to the rear of the breech-block, an adjustable closure for the rear end of the chamber, a firing pin extending through the breech-block, the chamber and the adjustable closure therefor, another block fast on the firing pin and having an extension passing through the slot in the chamber, a spring surrounding the firing pin and engaging the block thereon and the adjustable block at the rear end of the chamber, a spring-actuated trigger in the path of the extension of the block on the firing pin, a rod extending from the trigger to a point near the muzzle of the gun, and means for attaching the bait to the rod controlling the trigger.

6. In an animal trap, a gun comprising a barrel section adapted to receive a cartridge, a breech-block to the rear thereof, a coupling carried by the breech-block and to which the barrel section is secured by a bayonet joint, a chamber to the rear of the breech-block, an adjustable closure for the rear end of the chamber, a firing pin extending through the breech-block, the chamber and the closure therefor and provided with a manipulating handle exterior to the rear end of the chamber, a block carried by the firing pin within the chamber and having a lug exterior to the chamber, a spring surrounding the firing pin within the chamber between the block on the firing pin and the adjustable closure at the rear end of the chamber, a spring-controlled trigger in the path of the lug on the block, and an operating rod for the trigger and provided with means for attaching a bait thereto.

In testimony that I claim the foregoing as my own, I have hereto affixed my signature in the presence of two witnesses.

JOSEPH J. NANCE.

Witnesses:
NEWTON W. GRAHAM,
TOM NOLEN.